B. F. Burgess,
Saw.
N° 82,289.     Patented Sep. 22, 1868.
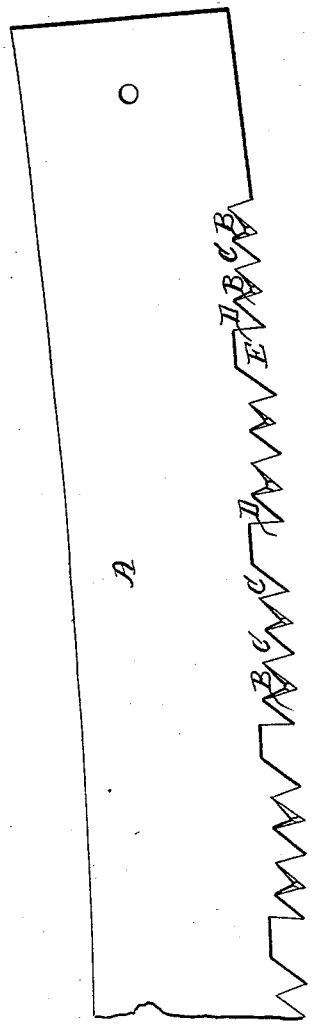
Witnesses.
Benjamin L. Hoyt
Charles K. Ketchum
Inventor:
Benjamin F. Burgess

United States Patent Office.

BENJAMIN F. BURGESS, OF NORVELL, MICHIGAN.

Letters Patent No. 82,289, dated September 22, 1868.

IMPROVEMENT IN SAWS.

The Schedule referred to in these Letters Patent and making part of the same.

TO ALL WHOM IT MAY CONCERN:

Be it known that I, BENJAMIN F. BURGESS, of Norvell, in the county of Jackson, in the State of Michigan, have invented a new and useful Improvement in Saws; and I do hereby declare that the following is a full, clear, and exact description of its construction and operation, reference being had to the annexed drawing, making part of this specification, in which the figure is a side view.

The nature of my invention consists in making a saw that will cut one way only, because the teeth are formed with unequal angles at their edges for the purpose of cutting one way, so as to cut and clear the kerf with one motion of the saw; and, to perfect the saw for that kind of use, I make the teeth in sections of five teeth each, the forward one to be straight with the plate of the saw to clear the kerf, and the others are fleam-teeth, and set alternately to cut the kerf required, and the edge of the saw or the points of the teeth are made in the segment of a circle or curve, for the purpose of having fewer teeth at work at one and the same time.

To enable others skilled in the art to make and use my invention, I will proceed to describe its mode of construction and operation.

A is the blade of the saw. The edge on which the teeth are to be made is made in the form of the segment of a circle or curve of any form. The teeth are made in sections of five teeth each, with space between them. The size of the space may be varied for different kinds of work, as when the saw is required to cut fast the space should be larger, and always large enough to carry away the chips cut off by the preceding section of cutting-teeth.

B is one of a series of cutting-teeth, of which there are two in each section. They are made with the angles from the blade unequal, the forward edge being more at right angles with the edge of the saw than the other, as shown in the figure. These teeth are bevelled at the point, and bent outward from the bevelled side sufficient to cause them to cut the size of kerf required.

C is one of a series of cutting-teeth, similar to the teeth B. They are bevelled on the opposite side from the teeth B, and are bent out to correspond with them.

D is a clearing-tooth. There is one at the forward part of each section. They are made with the angles more acute than the cutting-teeth, and the forward edge is nearer at right angles to the blade than the cutting-teeth. The edges of these teeth are left square, and the teeth are made shorter than the cutting-teeth, and are not bent, but are left straight to traverse the middle of the kerf. These teeth are made at the forward part of each section for the purpose of more perfectly clearing the kerf, and giving the succeeding cutting-teeth better access to the uncut wood.

E is a space between each section of teeth. Its size must be according to the amount of work required of the saw, or quality of timber to be cut. As this saw is intended to cut one way only, the space must be forward of each clearing-tooth, and each space arranged according to the curve of the cutting-edge of the saw, and may be made deeper into the blade than the space between the teeth, as shown in the figure.

Having thus fully described my invention, what I claim as new, and desire to secure by Letters Patent, is—

Making a saw that is to cut one way only, with the cutting-teeth B and C, and the clearing-tooth D forward of each section, and the space E, when constructed and all arranged as specified.

BENJAMIN F. BURGESS.

Witnesses:
BENJAMIN L. HOYT,
CHARLES KETCHUM.